(No Model.)

T. TANNER & H. H. FISCHER.
POST HOLE DIGGER.

No. 251,968.      Patented Jan. 3, 1882.

WITNESSES:
Theo. G. Hoster
C. Sedgwick

INVENTOR:
T. Tanner
H. H. Fischer
BY Munn & Co.
ATTORNEYS.

UNITED STATES PATENT OFFICE.

THEOPHILUS TANNER AND HERMANN H. FISCHER, OF OSAGE, NEBRASKA.

POST-HOLE DIGGER.

SPECIFICATION forming part of Letters Patent No. 251,968, dated January 3, 1882.

Application filed June 24, 1881. (No model.)

*To all whom it may concern:*

Be it known that we, THEOPHILUS TANNER and HERMANN H. FISCHER, of Osage, in the county of Otoe and State of Nebraska, have invented a new and useful Improvement in Post-Hole Diggers, of which the following is a full, clear, and exact description.

The invention consists in the combination, construction, and arrangement of parts hereinafter described.

Figure 1:
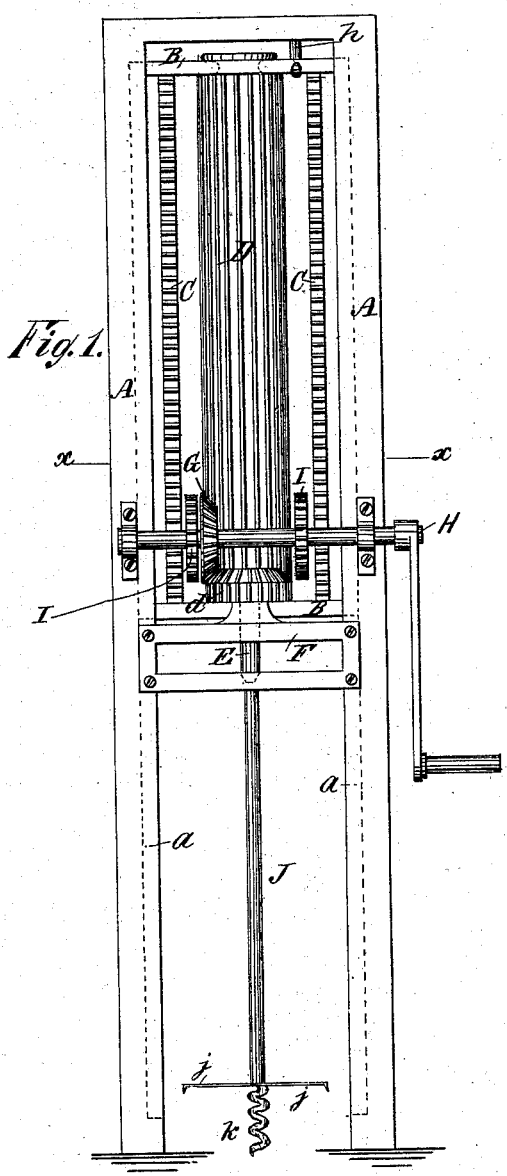
Figure 2:
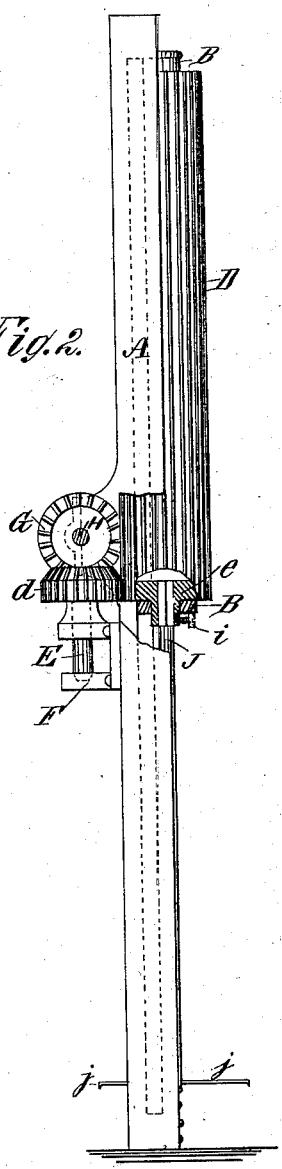
Figure 3:
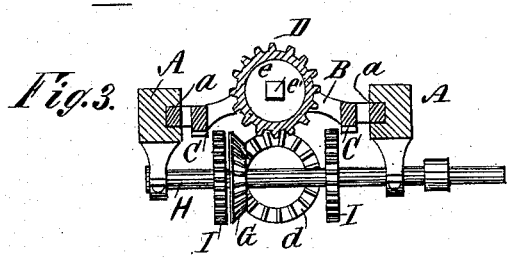

In the accompanying drawings, Figure 1 is a front elevation of our invention. Fig. 2 is a side elevation of the same with a portion of the main frame and a portion of the cogged cylinder broken away, and Fig. 3 is a horizontal section taken on the line $x\ x$ of Fig. 1.

Similar letters of reference indicate corresponding parts.

A A represent the side bars of the main frame, which are correspondingly guttered out on the inside, as shown at $a\ a$, to form ways, in which the ends of the cross-heads B B move. These cross-heads B B are tied together by the vertical rack-bars C C, and between the rack-bars, and in the center of the cross-bars, is journaled a cogged cylinder, D, which receives rotary motion from the crown-wheel $d$, which wheel is secured upon the upper end of the short vertical shaft E, journaled in the cross-piece F, secured to the front face of the side bars of the main frame. The crown-wheel receives motion from the cog-wheel G, secured upon the horizontal crank-shaft H, which is journaled in bearings secured upon the bars A A of the main frame. Upon the crank-shaft is placed the movable pinions I I, which are adapted to be moved upon the shaft to engage with the rack-bars C C, for elevating the cylinder D when the auger has reached the desired depth. When the cogged cylinder has reached the highest point it may be locked in that position by the hook $h$, secured to the top cross-piece of the main frame. The cogged cylinder is preferably made hollow, so as to be as light as possible, but still of sufficient weight to force the blades $j\ j$ of the auger to enter the ground, and the lower end of the cylinder is closed by the head $e$, in the center of which is formed the square opening $e'$, in which opening the square end of the shank J of the auger is secured by the set-screw $i$. The spiral point $k$ of the auger should be of the best tempered steel, and should be of such size and length as to guide the auger and assist its entrance into the ground.

In use, when the auger has been turned a sufficient depth into the ground the pinions I I are to be moved in contact with the rack-bars and keyed or otherwise secured to the crank-shaft. The crank is now to be turned backward, and thus elevate the cylinder and withdraw the auger from the ground.

We are aware that it is not new in post-hole diggers to use a toothed cylinder to carry the auger and a gear-wheel on a screw-rod operated by a lever, or pinions on a crank-shaft to mesh with racks on the cylinder, or to use a pinion on the upper end of a screw-rod carrying auger and meshing with two elongated gear-wheels, or to use a spiral point or a blade with lips; but

What we claim as new and of our invention is—

The combination of the cross-heads B, tied together by vertical rack-bars C C, the cogged cylinder D, the vertical shaft E, carrying crown-wheel $d$, and the crank-shaft H, carrying the cog-wheel G, and movable pinions I I, all arranged as described, and adapted to be used as set forth.

THEOPHILUS TANNER.
HERMANN H. FISCHER.

Witnesses:
WILLIAM TANGEMAN,
WILLIAM SCHAEHT: